(12) United States Patent
Gandel et al.

(10) Patent No.: US 6,593,734 B1
(45) Date of Patent: Jul. 15, 2003

(54) CONTACTLESS POSITION SENSOR WITH OPTIMIZED MAGNETIC VOLUME AND MAGNETO SENSITIVE PROBE

(75) Inventors: Pierre Gandel, Montfaucon (FR); Didier Frachon, Besancon (FR)

(73) Assignee: MMT S.A., Fribourg (CH)

( * ) Notice: Subject to any disclaimer, the term of this patent is extended or adjusted under 35 U.S.C. 154(b) by 0 days.

(21) Appl. No.: 09/926,111

(22) PCT Filed: Feb. 9, 2000

(86) PCT No.: PCT/FR00/00312

§ 371 (c)(1),
(2), (4) Date: Nov. 5, 2001

(87) PCT Pub. No.: WO00/52425

PCT Pub. Date: Sep. 8, 2000

(30) Foreign Application Priority Data

Mar. 3, 1999 (FR) .............................................. 99 02644

(51) Int. Cl.⁷ ............................. G01B 7/30; G01B 7/14; G01D 5/14
(52) U.S. Cl. ............................. 324/207.25; 324/207.2; 324/207.24
(58) Field of Search ............. 324/207.12, 207.2–207.25

(56) References Cited

U.S. PATENT DOCUMENTS 5,532,585 A  *  7/1996  Oudet et al. ......... 324/207.2 X
5,789,917 A  *  8/1998  Oudet et al. ............. 324/207.2
5,861,745 A  *  1/1999  Herden ..................... 324/207.2
6,130,535 A  * 10/2000  Herden et al. ........... 324/207.2

FOREIGN PATENT DOCUMENTS

FR       2715726      *  8/1995
WO    WO 98/55828      12/1998

OTHER PUBLICATIONS

Patent Abstracts of Japan, JP 63–026532, Feb. 4, 1988.

* cited by examiner

*Primary Examiner*—Gerard R. Strecker
(74) *Attorney, Agent, or Firm*—Oblon, Spivak, McClelland, Maier & Neustadt, P.C.

(57) ABSTRACT

A magnetic position sensor, linear or rotary, including a stator and at least a mobile part along at least a direction OX, with an effective stroke Xc. The stator includes at least two components made of soft magnetic material defining at least a secondary air gap in which is housed at least a magneto-sensitive probe. Each stator part component has a length Xs in the direction OX not less than Xc. The magnets of one mobile part are extended over at least one edge by a mobile ferromagnetic component having a thickness e, in the direction of a magnetization of one magnet, such that $0.1 L < e < 0.9 L$, L being a length of the magnet in a magnetization direction, and moving parallel to the stator ferromagnetic components at a constant minimum distance and having a magnetization perpendicular to OX and a length in the direction of displacement OX not less than Xc.

17 Claims, 9 Drawing Sheets

CONTACTLESS POSITION SENSOR WITH OPTIMIZED MAGNETIC VOLUME AND MAGNETO SENSITIVE PROBE

BACKGROUND OF THE INVENTION

The present invention relates to the art of contactless magnetic position sensors with magnetosensitive probe and permanent magnet.

Position sensors using Hall-effect probes to detect the magnetic flux generated by the relative displacement of a permanent magnet referenced to a Hall-effect probe are known in the prior art.

In particular, French Patent No. 2624966 describes a coder for a printwheel comprising a linear Hall-effect detector and a permanent magnet mounted in a nonferrous metal shaft provided with a bush forming a flux-conducting spiral molded in the wheel and encircling the shaft. The angular position of the printwheel is determined in absolute value by the signal amplitude relative to the transition point of the spiral. The sensor designed in this way does not provide a truly linear signal. According to one proposal in the prior art, this lack of linearity can be remedied by digitizing the signal delivered by the Hall-effect probe and processing the signal by information-processing means.

According to another proposal in the prior art, the lack of linearity of magnetic position sensors can be remedied by complex geometries. These solutions are technically difficult to implement for sensors produced industrially in large quantities. Consequently, the manufacturing cost is excessive in numerous applications.

Also proposed in the prior art are sensors having a movable part formed by a ferromagnetic yoke on which a permanent magnet of angular width in excess of 180° is directly fixed, the complementary part being formed by a ferromagnetic material, or by a permanent magnet of inverse polarity or by the air. Such a solution is proposed in French Patent Application 2739444. Since the angular width of the magnet is greater than 180°, it entails a large magnet volume, which is overdimensioned for the measurement of short strokes.

Solutions with two permanent magnets of alternate polarity and/or a plurality of Hall-effect probes have also been proposed. As an example, such solutions are proposed in French Patent Applications 2670286 and 2715726. These structures use multipole magnets or assemblies of a plurality of magnets having alternate directions, which precludes magnetization after assembly and makes it necessary to manipulate high-energy magnets during assembly of the sensors. Such manipulation requires great care, because high-energy magnets can introduce particles such as metal cuttings into the sensors while they are being placed in position. It is known that this drawback can be prevented by encapsulating the magnets, but such a solution has the drawback of further increasing the cost price of the sensors.

French Patent 2691534 describes a linear position sensor provided with a single movable two-pole permanent magnet inside a thin primary air gap bounded by two stator parts. This sensor necessitates a guide system for displacement of the permanent magnet. The necessary magnet volume and the linearity are not optimum. Consequently, in some exacting applications, this sensor has a cost and characteristics which are deemed to be unacceptable.

The prior art sensors use permanent magnets which generally contain rare earths of the neodymium-iron-boron or samarium-cobalt type. These high-performance magnets are still relatively expensive. Consequently the prior art structures have a relatively high cost.

The linearity of the signal delivered by the sensor as a function of position is a fundamental characteristic that determines the quality of a position sensor. In the ideal case, this function is a straight line.

The sensors cited hereinabove all use two transformations:

The first transformation is performed by the ferromagnetic circuit. This makes it possible to deliver to a magnetosensitive measuring component, such as a Hall-effect probe, a magnetic induction that varies as a function of position. The first transformation is then determined by the induction (position) characteristic.

The second transformation is performed by the measuring element inserted in the magnetic circuit. It delivers an output signal, generally in the form of a voltage, which varies with the amplitude of the induction in which it is placed. The second transformation is then determined by the voltage (induction) characteristic.

SUMMARY OF THE INVENTION

To obtain a sensor with very great linearity, it is desirable to perform two linear transformations with the greatest possible linearity.

If one of the transformations does not have more or less good linearity, it is necessary to compensate for its linearity error with the other transformation or by means of electronic and/or information-processing devices, which is costly and inelegant.

The linearity of the second transformation depends on the quality of the measuring element used. At present, commercial Hall-effect probes can be found that have a linearity error of smaller than ±0.2% over the characteristic (output signal/induction).

Very great linearity of the first transformation can be achieved by judicious design of the magnetic circuit, and this is the object of the present invention.

Another important characteristic of a position sensor is the amplitude of the signal-to-noise ratio. To construct a high-quality magnetic position sensor, it is necessary in practice to achieve a magnetic circuit that delivers a sufficiently large induction variation $\Delta B$ as a function of position that a high signal-to-noise ratio is obtained. This partly determines the volume and quality of the magnet to be used.

It must be noted that the use of an excessively large induction variation is not recommended. This in fact entails extra costs for the magnet. Moreover, the linearity of a Hall-effect probe (second transformation) deteriorates for high values of induction.

The object of the present invention is to provide an improved contactless magnetic position sensor of lower cost and great reliability, exhibiting great linearity together with an optimal magnet volume.

To this end, the invention relates in its more general embodiment to a magnetic position sensor provided with a stator and at least one part that is movable in at least one direction OX, with a useful stroke Xc,

[Xc represents, in the case of a rotary sensor, the width of the angular arc traveled by the movable part over the mean radius of a magnetized part and, in the case of a linear sensor, the stroke of the movable part in a direction contained in the central plane of the primary air gap], the stator being composed of at least two pieces of soft magnetic material defining at least one secondary air gap in which there is housed at least one magnetosensitive probe for measuring the variation of induction in this secondary air gap, each stator part having a length Xs equal to at least Xc in the direction OX,

[Xs being measured over the mean radius of a magnet in the case of a rotary sensor, or measured in a direction contained in the central plane of the primary air gap in the case of a linear sensor], each stator part being aligned, for a linear sensor, either in a given plane surface parallel to OX or in a given cylindrical surface whose axis is OX and, for a rotary sensor, in a given cylindrical surface whose axis corresponds to the axis of rotation of the movable part, the sensor being provided in addition with at least one movable part equipped with at least one piece of soft magnetic material and at least one magnet joined to that piece, the movable magnetic piece or pieces being displaced parallel to the ferromagnetic stator pieces at a constant minimal distance, the magnet or magnets having their poles parallel to the ferromagnetic pieces of the stator, characterized in that the magnet or magnets of one movable part are prolonged on at least one side by a movable ferromagnetic piece of thickness e, in the direction of magnetization of a magnet, such that $0.1\ L < e < 0.9\ L$, the magnet or magnets being displaced parallel to the ferromagnetic stator pieces at a constant minimal distance and having magnetization perpendicular to OX and a length equal to at least Xc in the direction of displacement OX

[Xc being measured over the mean radius of the magnet in the case of a magnet of semiannular form or the length in the case of a straight magnet].

According to a first modification, the magnet or magnets is or are partly embedded in a cavity of a movable ferromagnetic yoke on the stator side, having a depth e such that $0.1\ L < e < 0.9\ L$, where L is the thickness of the magnet in the magnetization direction.

According to a second modification, the magnet or magnets is or are disposed side-by-side with at least one movable ferromagnetic piece of thickness e in the direction of magnetization of a magnet, such that $0.1\ L < e < 0.9\ L$, the magnet or magnets having a length equal to at least Xc in the direction of displacement OX.

Advantageously, the movable member has a magnet partly embedded in a cavity situated substantially at the center of the movable ferromagnetic yoke, the cavity and the magnet having a length equal to at least Xc and preferably equal to $Xc+F+2\ E'$ in the direction OX, in the case of a magnet of semiannular form this length is measured over the mean radius of the magnet, F is the length of the air gap in the direction OX in which the probe is placed, E' ranges between $e/4$ and E, where E is the distance measured perpendicular to OX between the ferromagnetic stator pieces and the bottom of the cavity.

According to a particular embodiment, the movable member has a ferromagnetic yoke of length equal to at least $3\ Xc+F+6\ E'$ measured along OX.

Advantageously, the ferromagnetic stator pieces have a length Xs substantially equal to at least $Xc+2\ E'$, measured along OX, in the case of a rotary sensor the length is measured over the mean radius of a magnet.

Preferably the depth e of a cavity of the movable ferromagnetic yoke is determined in such a manner as to achieve a sensor of maximum linearity, preferably with $0.3\ L < e < 0.8\ L$.

According to one modification, the cavity in a movable ferromagnetic yoke is constructed in such a manner as to obtain the largest possible $e/L$ ratio, preferably with $0.5\ L < e < 0.9\ L$, while conserving a small linearity error, preferably of less than 3%.

According to a preferred embodiment, the thickness e, measured in the direction of magnetization of a magnet, of a movable ferromagnetic piece placed side-by-side with a permanent magnet is determined in such a manner as to achieve a sensor of maximum linearity, preferably with $0.3\ L < e < 0.8\ L$.

Preferably the thickness e, measured in the direction of magnetization of a magnet, of a movable ferromagnetic piece placed side-by-side with a permanent magnet, is provided in such a manner as to obtain the largest possible $e/L$ ratio, preferably with $0.5\ L < e < 0.9\ L$, while conserving a small linearity error, preferably of less than 3%.

According to a particular embodiment, the L/E ratio is greater than 0.5 and preferably greater than or equal to 0.75, where E is the distance measured perpendicular to OX between the ferromagnetic stator pieces and the bottom of the cavity.

Advantageously, the $Xs/e$ ratio is greater than 5 and preferably greater than or equal to 8.

Accordingly to one modification, the ferromagnetic stator pieces, the magnet or magnets and the movable ferromagnetic piece or pieces have the same length Z, which is preferably greater than or equal to 3 E, measured along the axis perpendicular to the direction of magnetization and to the direction of displacement OX.

According to another modification, the fixed and movable parts respectively are partly exchanged for movable and fixed parts respectively.

According to a modified embodiment, the stator structure is composed of four parallelepiped ferromagnetic pieces defining two pairs of secondary air gaps which intersect at a center point. Each secondary air gap being equipped with a magnetoresensitive probe.

According to one modification, the movable part can be displaced in two directions OX and OY, and it is composed of a ferromagnetic yoke in which there is partly embedded a permanent magnet polarized in the direction of the primary air gap that separates the stator parts from the movable yoke.

According to one modification, the movable part can be displaced in both directions OX and OY, and it is composed of a permanent magnet polarized in the direction of the primary air gap that separates the stator parts from the movable yoke, disposed side-by-side with at least one movable ferromagnetic part.

BRIEF DESCRIPTION OF THE DRAWINGS

The invention will be better understood by reading the description hereinafter with reference to the attached drawings, wherein.

DETAILED DESCRIPTION OF THE INVENTION

Figure 1:
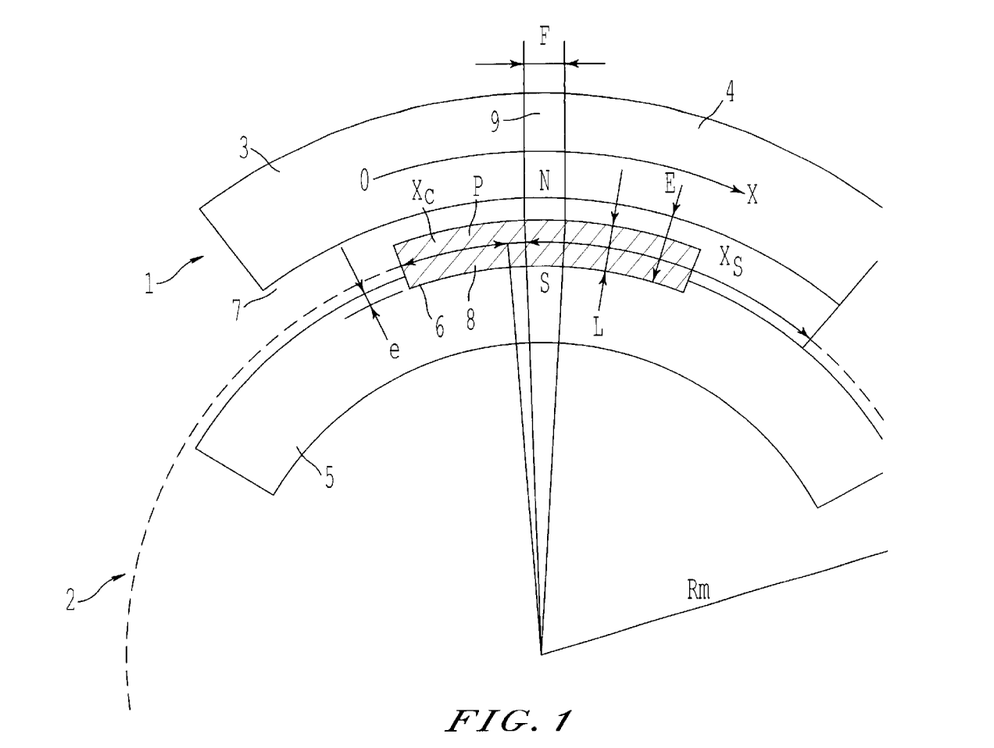
FIG. 1 shows a partial view of a sensor according to the invention.
Figure 2:
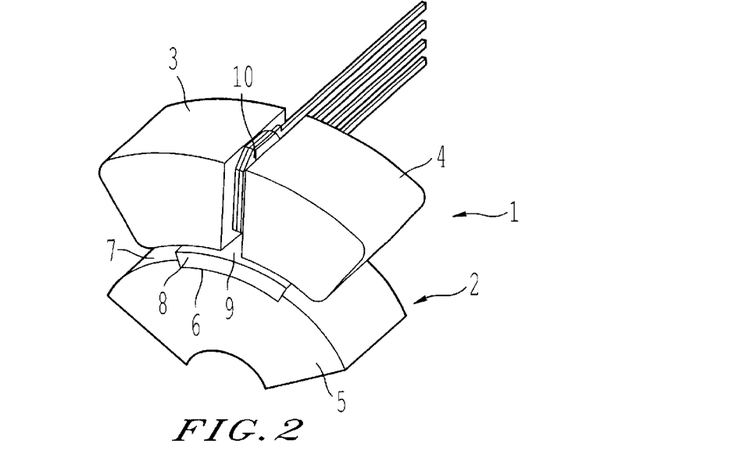
FIG. 2 shows a practical example of a contactless magnetic angular position sensor according to the invention.

FIGS. 1 and 2 respectively shows a schematic view and a perspective view of a first modified embodiment in a rotary configuration.

This sensor is provided with a fixed stator (1) and a part (2) which is movable in the direction OX, with a useful stroke Xc over which the delivered signal has great linearity.

The stator is provided with two stator pieces (3, 4) of a soft magnetic material in the form of annular quadrants. Movable part (2) has a soft iron yoke (5) of semiannular form. Stator pieces (3, 4) and yoke (5) define between them a primary air gap (7). Yoke (5) has a cavity (6) in which there is housed a magnet (8) magnetized perpendicular to air gap (7), or in radial direction in the present case.

The stator has two ferromagnetic pieces (3, 4) spaced apart by a secondary air gap (9) of length F, in which there is placed a magnetosensitive probe (10). The two stator pieces (3, 4) are joined by nonmagnetic pieces made of brass, for example, and are aligned in the same cylindrical surface, whose axis is the axis of rotation of the movable part.

The stroke Xc is the width of the angular arc traveled by the movable part over the mean radius Rm of the magnetized part. The stroke of the magnet extends by ±Xc/2 relative to the center of the secondary air gap, in which the magnetosensitive probe is disposed perpendicular to the primary air gap.

The movable part (2) is provided with a yoke (5) of soft magnetic material and a permanent magnet (8) partly embedded in yoke (5). Magnet (8) is polarized radially, or in other words perpendicular to OX. Movable part (2) is displaced parallel to stator pieces (3, 4), at a constant minimal distance Yo measured perpendicular to OX.

Permanent magnet (8) is partly embedded in a cavity situated substantially at the center of movable yoke (5), on the side of stator pieces (3, 4), at a depth e such that 0.1 L<e<0.9 L, where L is the thickness of magnet (8) in the polarization direction. Depth e is determined in such a manner as to optimize the characteristics of the sensor.

Permanent magnet (8) is displaced together with yoke (5) parallel to stator pieces (3, 4) at a constant minimum distance E−L, where E is the distance between the stator pieces and the cavity bottom, measured perpendicular to OX. Yoke (5) is situated at a minimum distance from the stator equal to Yo=E−e, which is larger than E−L.

Width Xs of stator pieces (3, 4) measured over the mean radius Rm of magnet (8) is greater than or equal to Xc, preferably substantially equal to Xc+2 E', in order to obtain a signal with great linearity over the entire stroke Xc, where E' ranges between e/4 and E.

Preferably the width of the cavity in movable yoke (5) and of magnet (8), measured over the mean radius Rm of magnet (8), is larger than or equal to Xc+F, preferably substantially equal to Xc+F+2 E'.

According to an advantageous modification, the width of movable yoke (5) measured over the mean radius Rm of magnet (8) is equal to at least 3 Xc+F+6 E'.

According to an advantageous modification, the L/E ratio is greater than or equal to 0.5, and preferably greater than or equal to 0.75.

According to an advantageous modification, the Xs/E ratio is relatively large, preferably greater than 8.

According to an advantageous modification, magnet (8), movable yoke (5) and ferromagnetic stator pieces (3, 4) have the same length Z measured along the axis perpendicular to the direction of magnetization and to the direction of displacement OX, and preferably greater than or equal to 3 E.

These advantageous modifications make it possible to define a sensor with an optimal geometry and a volume of magnet (8) adapted to the desired measurement range.

Magnetosensitive probe (10) can be a Hall-effect probe, a magnetoresistive probe, a magnetic transistor, etc. What is important is that the delivered signal depends as linearly as possible on the magnetic induction in which this element is placed.

Permanent magnet (8) can be of different types, and preferably there will be used a magnet (8) of samarium-cobalt or NdFeB, or possibly even a magnet (8) of AlNiCo or ferrite type, etc. What is important is that it have a reversible permeability close to 1, and preferably less than 1.2, in order to obtain good linearity of the signal. It will be preferable to choose a magnet (8) with a low temperature coefficient.

The ferromagnetic stator parts and movable yoke (5) can be made of iron-nickel, iron-silicon, pure iron, etc.

It is not necessary to introduce a guide piece for magnet (8), since it is directly fixed on movable yoke (5). The embedding of magnet (8) in yoke (5) also makes it possible to reduce the sensitivity of the sensor to the quality of bonding of magnet (8), and it facilitates placement of the magnet on yoke (5) during production operations.

The present invention makes it possible to minimize the volume of magnet (8) or to increase the induction variation ΔB and thus the signal-to-noise ratio. The invention also makes it possible to increase the linearity of the sensor.

To this end, the invention relates to a magnetic position sensor provided with a stator structure possessing at least one air gap, in which there is placed at least one magnetosensitive probe (10), and with a movable part (2) provided with at least one ferromagnetic yoke (5), characterized in that movable part (2) is provided with at least one permanent magnet (8) magnetized in the direction of the air gap separating the stator from the movable part (2), which is partly embedded in a cavity provided in movable ferromagnetic yoke (5).

The depth e of the cavity provided in movable yoke (5) is chosen judiciously in order to increase, relative to the case without cavity (e=0), with an identical magnet (8) and the same overall outside dimensions, the magnetic induction delivered by the magnetic circuit to magnetosensitive probe (10), and/or in order to improve the linearity of the sensor along the stroke.

Contrary to certain prior art structures, which use a magnet volume in the form of a bush or disk distributed over 360° regardless of the length of the stroke to be measured, the sensor according to the invention is provided with a magnet or magnets having dimensions directly adapted to the desired measurement range. This makes it possible to reduce the volume of magnet (8) and consequently the cost of the sensor very appreciably, particularly in the case of sensors designed for measurement of short strokes.

Figure 3:
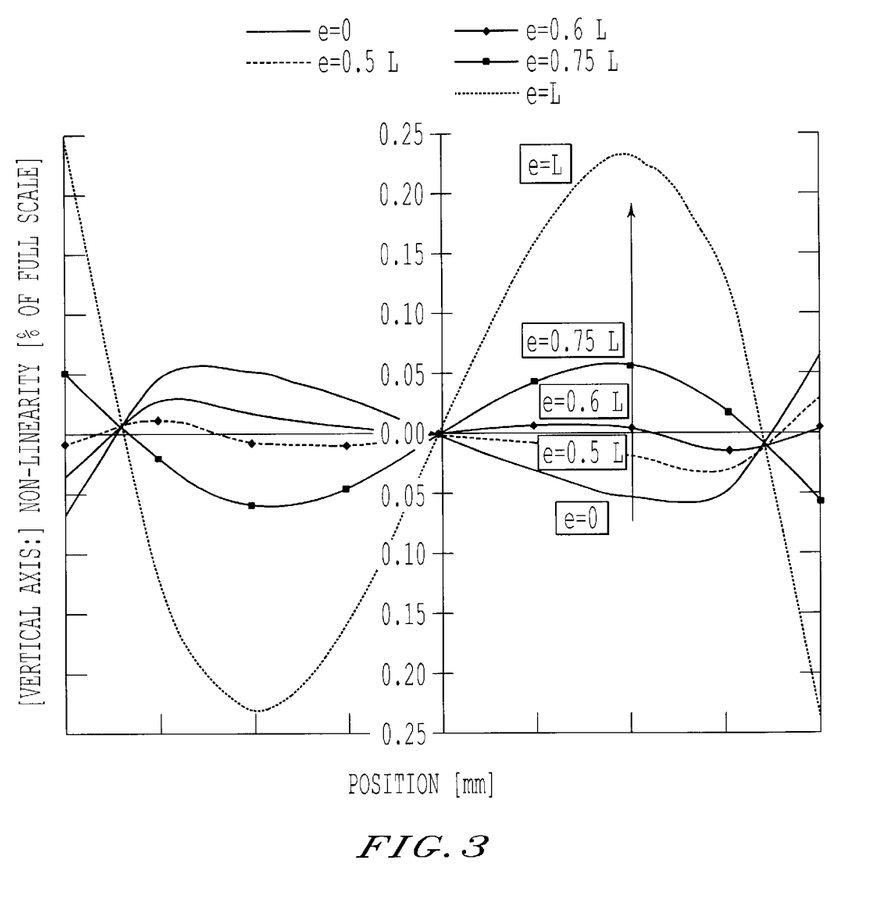
FIG. 3 represents a curve of nonlinearity as a function of position.

The embedding of permanent magnet (8) modifies the distribution and amplitude of leakage fluxes, and thus makes it possible to influence the linearity of the sensor. It can be shown that the linearity varies as a function of the depth of cavity (6) in which permanent magnet (8) is partly embedded. FIG. 3 shows the evolution of the linearity error (=nonlinearity) of a sensor, obtained along the stroke, as a function of the depth e of cavity (6).

By plotting the linearity error as a function of the position and as a function of the depth of cavity (6), it is evident that a change of sign takes place when the depth varies between 0 and L, where L is the thickness of magnet (8) in the direction of magnetization. Thus there exists an optimum for which the linearity error of the induction/position characteristic becomes substantially zero.

In the example of FIG. 3, with a cavity (6) of depth e=0.6 L, we obtain a clear improvement of the linearity (smaller nonlinearity) compared with the case without cavity (6) (e=0).

Very generally, the particular cases in which magnet (8) is not embedded (e=0) or is totally embedded (e=L) do not correspond to an optimum of linearity.

The invention then makes it possible to construct a magnetic circuit which delivers to magnetosensitive probe (10) an induction of very great linearity relative to the position to be measured.

The induction delivered by the magnetic circuit to magnetosensitive probe (10) increases strictly with the embedding height e. To increase the variation of induction along the stroke, it is then necessary to construct a cavity (6) of the greatest possible depth, until the limit of nonlinearity deemed satisfactory for the given application is reached.

The technique proposed by the invention makes it possible to increase the induction variation $\Delta B$ appreciably relative to the case without embedding (e=0), without supplementary piece, without modification of the overall outside dimensions and virtually without extra cost (very slightly more than for iron) and, in addition, it permits an improvement of the linearity in the case of judiciously chosen embedding.

With embedding of permanent magnet (8), we can conserve the same induction variation $\Delta B$ as without embedding (e=0) while reducing the magnet volume or while using a magnet of poorer quality, and therefore while reducing the cost of the sensor, while conserving the same overall outside dimensions.

In certain applications in which very great linearity is desired, we preferentially will search for the optimum embedding. On the other hand, in applications in which substantially larger measurement errors can be tolerated, we will use relatively deep embedding, preferably of between 0.4 L and 0.9 L, in order to give preference to increasing the induction variation $\Delta B$ or to reducing the cost of magnet (8) (reduction of the volume and/or use of a magnet (8) of poorer quality).

The principle of the invention then comprises optimizing the embedding height, with 0.1 L<e<0.9 L, in order to achieve the best compromise between linearity and the necessary volume of magnet (8), in order to meet a particular set of specifications, and thus to achieve a sensor of lower cost.

The embedding of magnet (8) in yoke (5) makes it possible to reduce the sensitivity of the sensor to the quality of bonding of magnet (8), and it facilitates placement of the magnet on yoke (5) during production operations. In addition, it is not necessary to introduce a guide piece for magnet (8), since it is directly fixed on movable yoke (5). The construction and production of such a sensor is then relatively simple and economical.

The invention can be applied to linear and angular position sensors. The principle can be transposed easily by those skilled in the art to numerous architectures of magnetic sensors, the examples presented in this patent application not being exhaustive.

FIG. 2 shows a contactless magnetic angular position sensor according to the invention, whose principle is based on the relative displacement of a permanent magnet (8) referenced to a magnetosensitive probe (10). This sensor has a stator structure composed of two ferromagnetic pieces of semiannular form separated by an air gap of constant length F, in which there is placed a magnetosensitive probe (10). Movable part (2) has a ferromagnetic yoke (5) of semiannular form in which there is provided a cavity (6) to receive a radially magnetized semiannular permanent magnet (8). The depth of cavity (6) is chosen in such a manner as to optimize the characteristics of the sensor for the given application.

Figure 4:
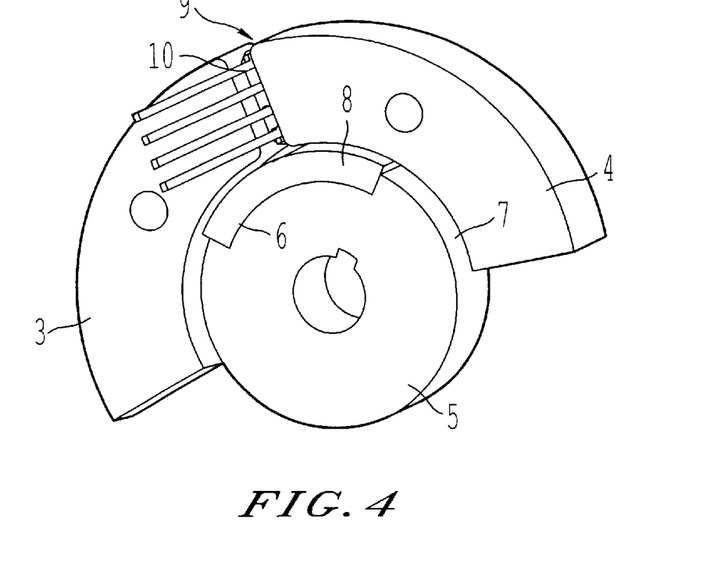
FIG. 4 shows a modified embodiment.

FIG. 4 shows a modified embodiment. Movable part (2) has a ferromagnetic yoke (5) of annular form in which there is provided a cavity (6) to receive a radially magnetized semiannular permanent magnet (8). The depth of cavity (6) is chosen in such a manner as to optimize the characteristics of the sensor for the given application.

Figure 5:
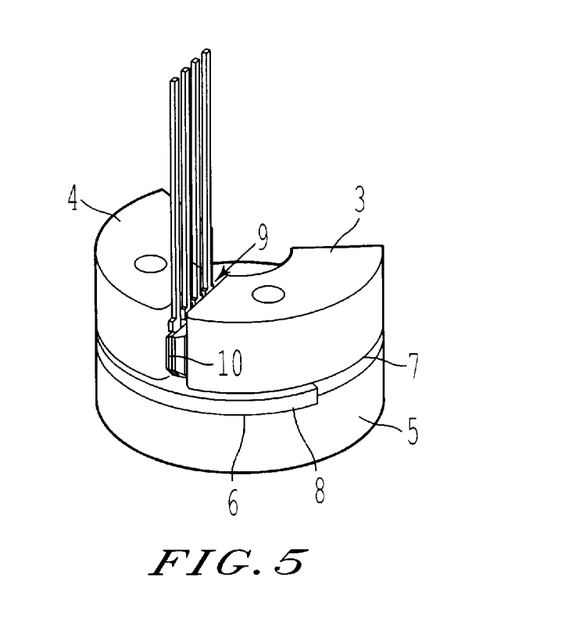
FIG. 5 shows another modification of a magnetic angular position sensor according to the invention.

FIG. 5 shows a magnetic angular position sensor according to the invention. This sensor has a stator structure (3, 4) composed of two ferromagnetic pieces of semiannular form separated by an air gap of constant length F, in which there is placed a magnetosensitive probe (10). Movable part (2) is provided with a ferromagnetic yoke (5) of semiannular form in which there is provided a cavity (6) to receive a semiannular permanent magnet (8) that is magnetized axially, parallel to the axis of rotation. The depth of cavity (6) is determined in such a manner as to optimize the characteristics of the sensor.

The preferred dimensions (angular width of magnet (8), width of the stator poles, etc.) that make it possible to optimize the geometry of the sensor can be deduced without difficulty from the modification described hereinabove (FIGS. 1 and 2).

Figure 6:
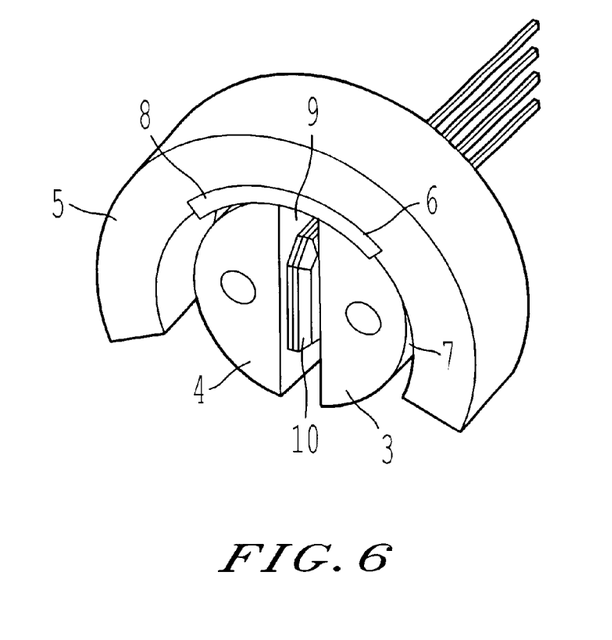
FIG. 6 shows a modification of a magnetic angular position sensor according to the invention.

FIG. 6 shows a magnetic angular position sensor according to the invention. It has a stator structure composed of two ferromagnetic pieces in the form of portions of a cylinder, separated by an air gap of constant length F, in which there is placed a magnetosensitive probe (10). Movable part (2), situated on the outside, is provided with a ferromagnetic yoke (5) of semiannular form in which there is provided a cavity (6) to receive a radially magnetized semiannular permanent magnet (8).

Figure 7:
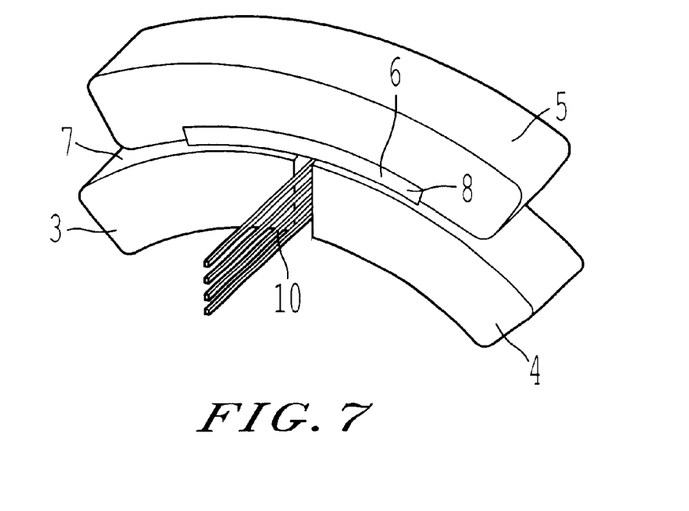
FIG. 7 shows a modified embodiment of the sensor of FIG. 6.

FIG. 7 shows a modified embodiment of the sensor of FIG. 6, with stator pieces in the form of portions of a ring, guiding the magnetic flux into the probe.

On the basis of the preceding structures, it is possible to construct sensors containing a plurality of magnetosensitive probes (10), associated with one or more partly embedded permanent magnets, in order to achieve redundancy and thus to improve the reliability and quality of the sensor.

Figure 8:
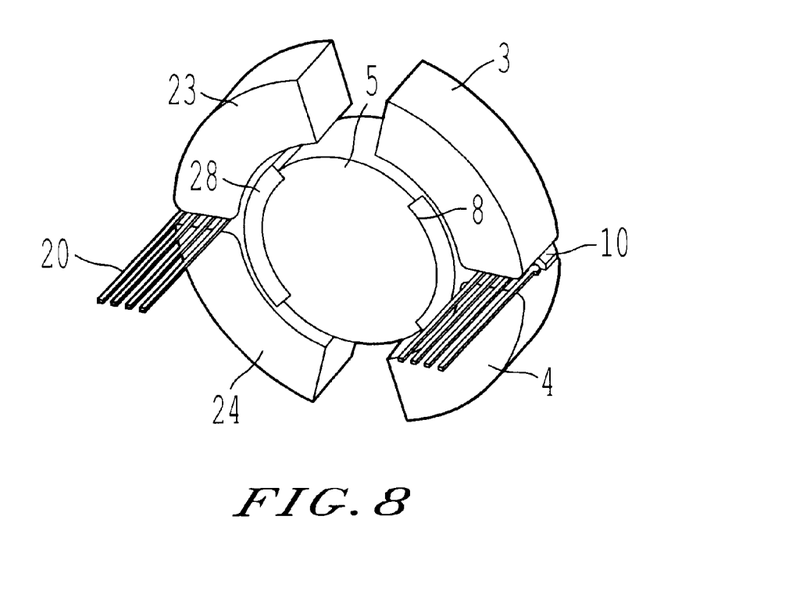
FIG. 8 shows a modification that integrates two elementary rotary sensors according to the invention.

FIG. 8 shows a modification that integrates two elementary rotary sensors according to the invention as shown in FIG. 4. This sensor is provided with two Hall-effect probes (10, 20), each placed between two ferromagnetic stator parts (3, 4) and (23, 24). The rotor is provided with two radially magnetized magnets (8, 28) of semiannular form, partly embedded in ferromagnetic rotor-type yoke (5).

Figure 9:
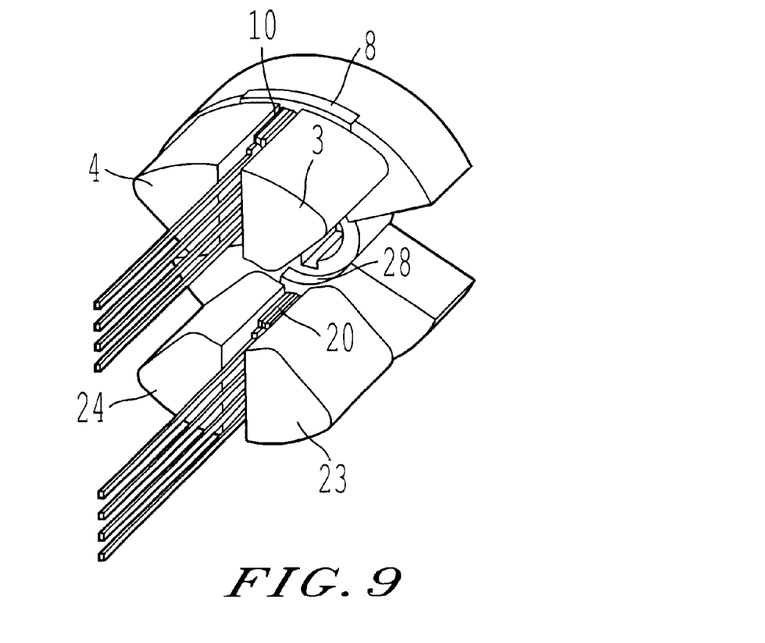
FIG. 9 shows a modification that integrates two elementary rotary sensors.

FIG. 9 shows a modification that integrates two elementary rotary sensors according to the invention as shown in FIG. 5. This sensor is provided with two Hall-effect probes (10, 20), each placed between two ferromagnetic stator parts (3, 4) and (23, 24). The rotor is provided with two magnets (8, 28) of semiannular form that are magnetized axially, in the direction of the axis of rotation, and that are partly embedded in a rotor-type yoke (5).

With the objective of achieving protection against external parasitic magnetic fields that could perturb the magnetic induction delivered to the probe, it is possible in certain cases to construct a closed external rotor-type yoke (5).

Figure 10:
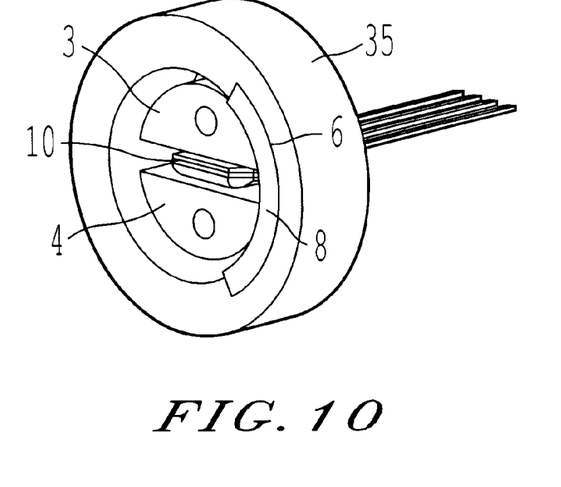
FIGS. 10 and 11 show sensor modifications with an annular ferromagnetic rotor-type yoke provided with one or two permanent magnets and with two magnets of semiannular form.

FIG. 10 shows a modification with a ferromagnetic annular rotor-type yoke (35). This yoke (35) functions as a screen against external magnetic fields. The proposed modification uses a radially magnetized magnet (8) of semiannular form, partly embedded in rotor-type yoke (35).

Figure 11:
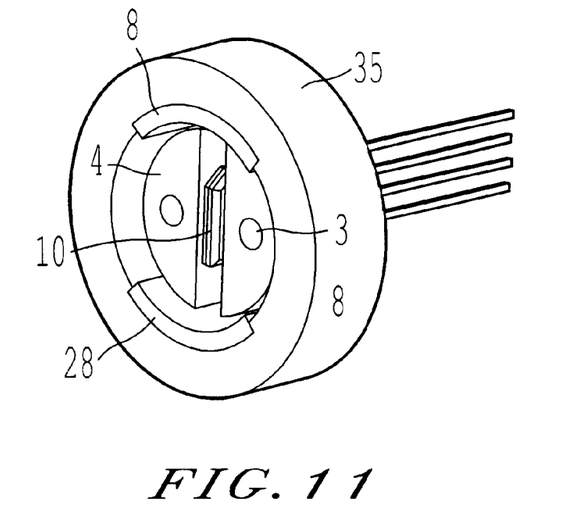

FIG. 11 shows a modification of the sensor shown in FIG. 10, with two radially magnetized permanent magnets (8, 28) of semiannular form, partly embedded in ferromagnetic rotor-type yoke (35) at diametrically opposite positions.

The invention can be applied in analogous manner to linear position sensors.

Figure 12:
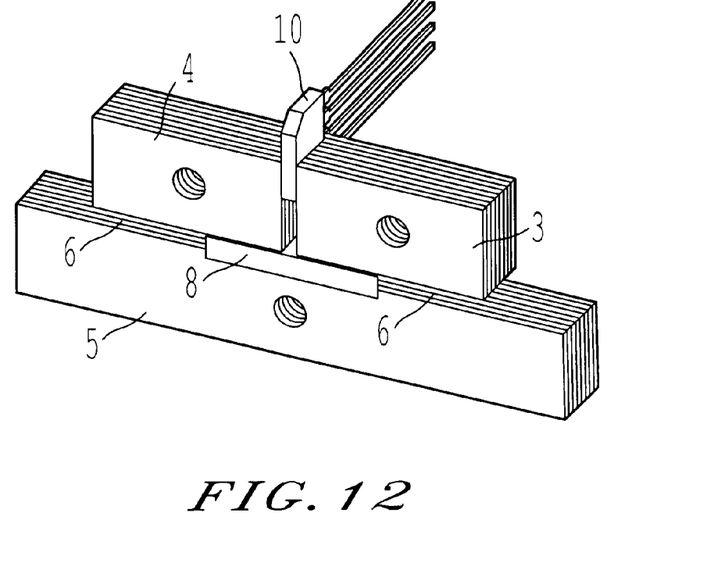
FIG. 12 shows a linear magnetic position sensor according to the invention.

FIG. 12 shows a contactless magnetic linear position sensor according to the invention, the principle of which is based on the relative displacement of a permanent magnet (8) referenced to a magnetosensitive probe (10). The structure of this sensor can be obtained directly by "uncoiling" the sensor of FIG. 2. The stator has a structure composed of two ferromagnetic pieces of parallelepiped form separated by a secondary air gap of constant length, in which there is placed a magnetosensitive probe (10). Movable part (2) is provided with a ferromagnetic yoke (5) of parallelepiped form in which there is provided a cavity (6) to receive a permanent parallelepiped magnet (8). Magnet (8) is polarized in the direction of the primary air gap separating the stator pieces (3, 4) from the movable part (2). The depth of cavity (6) is determined in such a manner as to optimize the characteristics of the sensor.

The preferred dimensions (width of magnet (8), width of the stator poles, etc.) that make it possible to optimize the geometry of the sensor can be deduced without difficulty from the rotary case described hereinabove.

Figure 13:
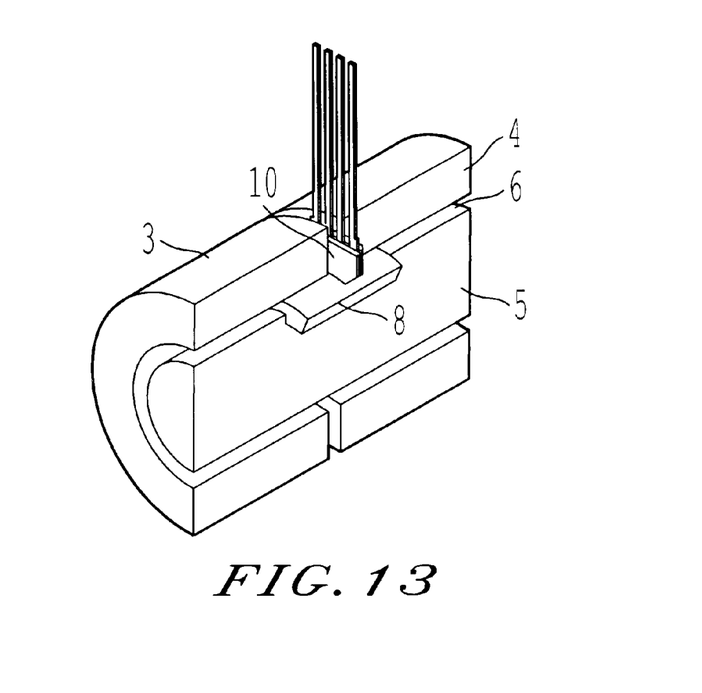
FIG. 13 shows a sectional view of a modified embodiment of a linear position sensor.

FIG. 13 shows a sectional view of a modified embodiment of a linear position sensor. The stator has a stator structure composed of two ferromagnetic pieces of tubular form separated by an air gap of constant length, in which there is placed a magnetosensitive probe (10). Movable part (2) is provided with a ferromagnetic yoke (5) of cylindrical form, in which there is provided a cavity (6) to receive a radially magnetized semiannular permanent magnet (8).

Figure 14:
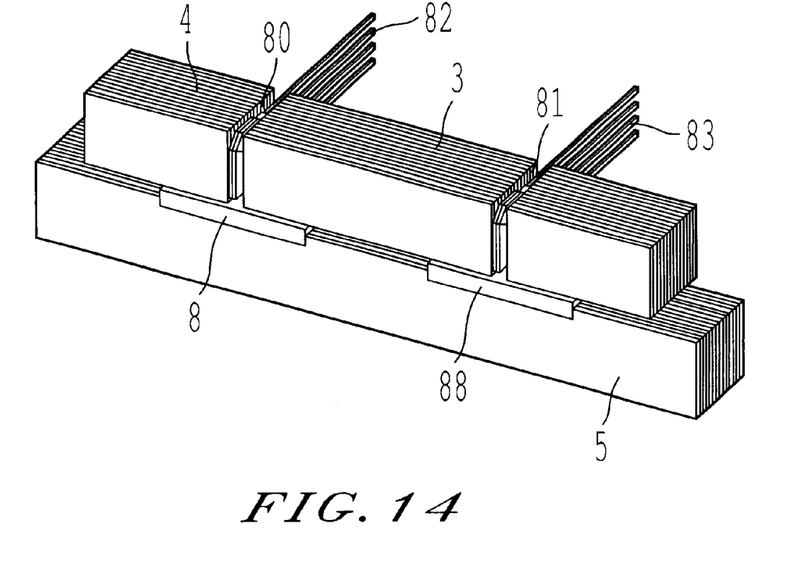
FIG. 14 shows a modification of the sensor according to FIG. 12, with two magnets.

FIG. 14 shows a modification of the sensor according to the invention described in FIG. 12, with two permanent magnets (8, 88) of parallelepiped form, partly embedded in movable ferromagnetic yoke (5). The stator is provided with two air gaps (80, 81), each capable of housing a Hall-effect probe (82, 83).

In each of the proposed embodiments, it is possible to exchange the structure of the fixed part and that of the movable part.

The principle of the invention is also applicable to contactless magnetic position sensors that are two-dimensional, or in other words that have two degrees of freedom.

Figure 15:
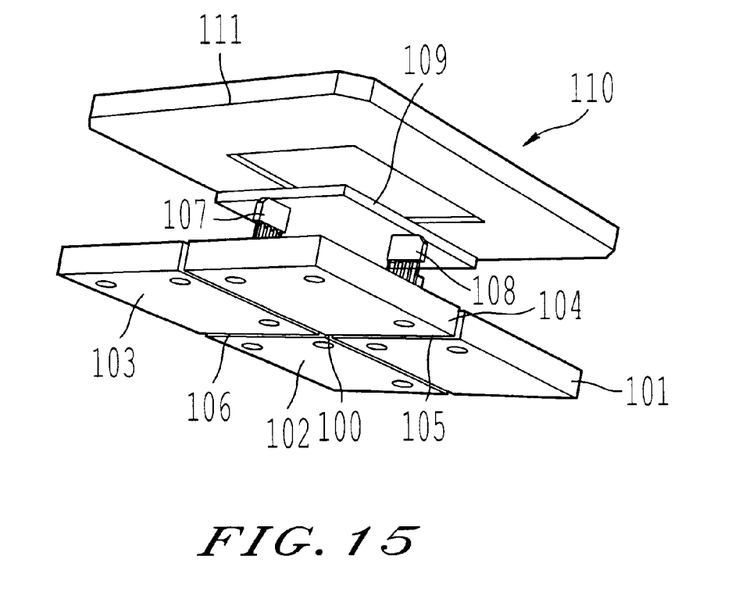
FIGS. 15 and 16 respectively show an exploded view and an assembled view of a magnetic position sensor with two degrees of freedom according to the invention.
Figure 16:
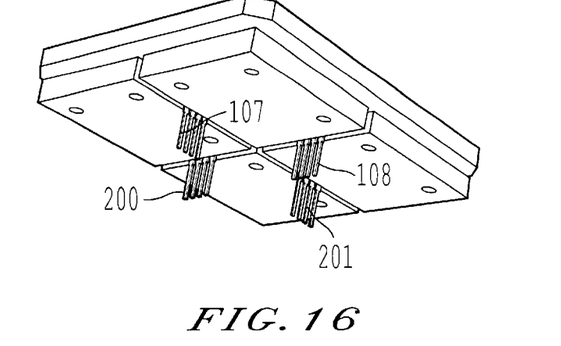

FIGS. 15 and 16 respectively show an exploded view and an assembled view of a magnetic position sensor with two degrees of freedom according to the invention. The stator structure is composed of four parallelepiped ferromagnetic pieces (101, 102, 103, 104) defining two pairs of secondary air gaps that intersect at a center point (100). Each secondary air gap (105, 106) is equipped with a magnetosensitive probe (107, 108, 200, 201).

Movable part (110) can be displaced in two directions OX and OY. It is composed of a ferromagnetic yoke (111) in which there is partly embedded a permanent magnet (109). Magnet (109) is polarized in the direction of the primary air gap that separates the stator parts from the movable yoke, or in other words perpendicular to degrees of freedom OX and OY.

Magnetosensitive probes (107, 108, 200, 201) deliver signals that can be combined in order to obtain two independent signals, that are linear relative to displacements along OX and along OY respectively. The depth of the cavity made in the movable yoke is determined in such a manner as to optimize the characteristics of the sensor, by influencing the linearity of the signals and the induction variation $\Delta B$ in each of the probes (107, 108, 200, 201), in the same manner as in the cases with a single degree of freedom. The principle of the invention comprises optimizing the embedding height, in order to achieve the best compromise between linearity and the necessary magnet volume, in order to meet a particular set of specifications, and thus to achieve a sensor with two degrees of freedom of lower cost.

It is possible to construct a sensor with a movable magnet inside an air gap defined by ferromagnetic stator parts and to embed this magnet or to place it side-by-side with one or more movable ferromagnetic pieces. The thickness e of the movable ferromagnetic pieces in the direction of magnetization is determined in such a manner as to optimize the characteristics of the sensor, with $0.1 < e < 0.9\ L$, as described hereinabove.

This approach can be applied to each of the structures described hereinabove.

This type of embodiment makes it possible greatly to reduce the attractive forces between the magnetized movable part and the ferromagnetic stator parts. These forces are perpendicular to the displacement OX, and they become relatively small when the movable parts are well centered in the air gap. The added movable ferromagnetic parts can also be used for guidance of the magnet or magnets.

Figure 17:
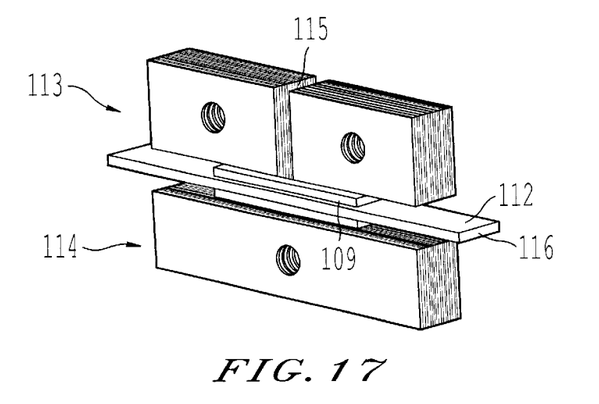
FIG. 17 shows a modification of a linear position sensor.

FIG. 17 shows a modification of a linear position sensor. Permanent magnet (109) is displaced inside an air gap (112) defined by two fixed stator parts (113, 114), inside which there is provided an air gap (115) for housing a magnetosensitive probe. Permanent magnet (109) is partly embedded in a movable ferromagnetic piece (116), whose thickness in the direction of magnetization falls in the range $0.1\ L < e < 0.9$ L. Movable ferromagnetic piece (116) provides guidance, and its thickness is determined in such a manner as to optimize the characteristics of the sensor. Movable ferromagnetic piece (116) in the present case is provided with a hole to receive the permanent magnet. It is possible to provide one or more cavities in the movable ferromagnetic piece without cutting holes in it, in order to house one or more permanent magnets therein.

Figure 18:
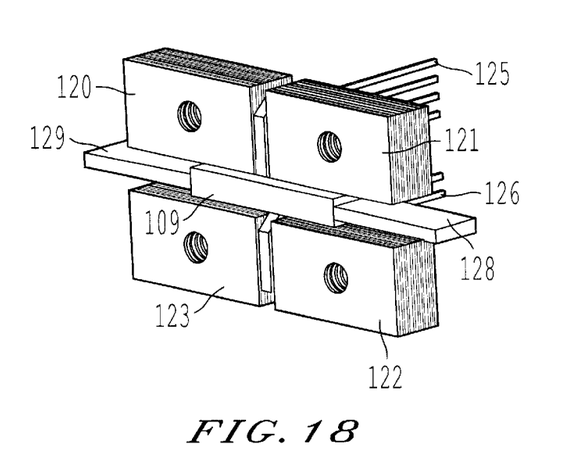
FIG. 18 shows a modification of the linear position sensor of FIG. 17.

FIG. 18 shows a modification of the linear position sensor of FIG. 17, using two magnetosensitive probes for the purpose of reducing the sensitivity of the sensor to a parasitic external field.

This sensor is provided with four ferromagnetic stator pieces (120 to 123), which define two secondary air gaps, within which there are placed two magnetosensitive probes (125, 126). Two ferromagnetic pieces (128, 129) are placed side-by-side with the movable magnet. The thickness of the movable ferromagnetic pieces (128, 129) is determined in such a manner as to optimize the characteristics of the sensor.

When the sensor is perturbed by a substantially homogeneous external magnetic field, the perturbation measured by the two probes is substantially identical. Subtraction of the signals delivered by the two probes then makes it possible to recreate a useful signal that is virtually insensitive to the perturbing external magnetic field. This structure then has relatively great insensitivity to any external field.

What is claimed is:

1. A magnetic position sensor provided with a stator and at least one part that is movable in at least one direction OX, with a useful stroke Xc, Xc representing, in a case of a rotary sensor, a width of an angular arc traveled by the movable part over a mean radius of a magnetized part and, in a case of a linear sensor, a stroke of the movable part in a direction contained in a central plane of a primary air gap, the stator being composed of at least two ferromagnetic pieces of soft magnetic material defining at least one secondary air gap in which is housed at least one magnetosensitive probe for measuring variation of induction in the secondary air gap, each stator ferromagnetic piece having a length Xs equal to at least Xc in the direction OX, Xs being measured over the mean radius of the magnetized part in the case of the rotary sensor, or measured in a direction contained in the central plane of the primary air gap in the case of the linear sensor, each stator ferromagnetic piece being aligned, for a linear sensor, either in a given plane surface parallel to OX or in a given cylindrical surface whose axis is OX and, for a rotary sensor, in a given cylindrical surface whose axis corresponds to an axis of rotation of the movable part, the sensor being provided in addition with at least one movable part equipped with the at least one movable yoke of soft magnetic material and at least one magnet joined to that at least one movable yoke, each movable magnetic part being displaced parallel to the ferromagnetic stator pieces at a constant minimal distance, the at least one magnet having its poles parallel to the ferromagnetic pieces of the stator, wherein the at least one magnet is partly embedded in a cavity situated substantially at a center of the movable yoke at a depth e such that $0.1\,L<e<0.9\,L$, where L is a thickness of the at least one magnet in a magnetization direction, the at least one magnet being displaced parallel to the ferromagnetic stator pieces at a constant minimal distance and having magnetization perpendicular to OX and a length equal to at least Xc in the direction of displacement OX, Xc being measured over the mean radius of the magnet in a case of a magnet of semiannular form or a length in a case of a straight magnet.

2. A magnetic position sensor according to claim 1, wherein the at least one magnet is partly embedded in the cavity of a movable yoke on the stator side, having a depth e such that $0.1\,L<e<0.9\,L$, where L is a thickness of the at least one magnet in the magnetization direction.

3. A magnetic position sensor according to claim 1, wherein the at least one magnet is disposed side-by-side with at least one movable yoke of thickness e in the direction of magnetization of the at least one magnet, such that $0.1\,L<e<0.9\,L$, the at least one magnet having a length equal to at least Xc in the direction of displacement OX.

4. A magnetic position sensor according to claim 1, wherein the movable part has the at least one magnet partly embedded in the cavity situated substantially at a center of the movable yoke, the cavity and the at least one magnet having a length equal to at least Xc, and equal to Xc+F+2 E' in the direction OX, in a case of the at least one magnet of semiannular form this length is measured over the mean radius of the at least one magnet, wherein F is a length of the air gap in the direction OX in which the probe is placed, E' ranges between e/4 and E, where E is a distance measured perpendicular to OX between the ferromagnetic stator pieces and a bottom of the cavity.

5. A magnetic position sensor according to claim 1, wherein the movable part has a ferromagnetic yoke of length equal to at least 3 Xc+F+6 E' measured along OX.

6. A magnetic position sensor according to claim 1, wherein the ferromagnetic stator pieces have a length Xs substantially equal to at least Xc+2 E', measured along OX, in the case of a rotary sensor the length is measured over the mean radius of the at least one magnet where E' ranges between a/4 and E, where E is the distance measured perpendicular to OX between the ferromagnetic stator pieces and a bottom of the cavity.

7. A magnetic position sensor according to claim 1, wherein the depth e of a cavity of the movable ferromagnetic yoke is determined in such a manner as to achieve a sensor of maximum linearity, preferably with $0.3\,L<e<0.8\,L$.

8. A magnetic position sensor according to claim 1, wherein the cavity in the movable ferromagnetic yoke is constructed in such a manner as to obtain a largest possible e/L ratio, preferably with $0.5\,L<e<0.9\,L$, while conserving a small linearity error, preferably of less than 3%.

9. A magnetic position sensor according to claim 3, wherein the thickness e, measured in the direction of magnetization of the at least one magnet, of the movable yoke placed side-by-side with a permanent magnet is determined in such a manner as to achieve a sensor of maximum linearity, preferably with $0.3\,L<e<0.8\,L$.

10. A magnetic position sensor according to claim 3, wherein the thickness e, measured in the direction of magnetization of the at least one magnet, of the movable yoke placed side-by-side with a permanent magnet, is provided in such a manner as to obtain a largest possible e/L ratio, preferably with $0.5\,L<e<0.9\,L$, while conserving a small linearity error, preferably of less than 3%.

11. A magnetic position sensor according to claim 1, wherein an L/E ratio is greater than 0.5 and preferably greater than or equal to 0.75, where E is a distance measured perpendicular to OX between the ferromagnetic stator pieces and a bottom of the cavity.

12. A magnetic position sensor according to claim 6, wherein an Xs/E ratio is greater than 5 and preferably greater than or equal to 8.

13. A magnetic position sensor according to claim 4, wherein the ferromagnetic stator pieces, the at least one magnet and the movable yoke have a same length Z, which is preferably greater than or equal to 3 E, measured along an axis perpendicular to the direction of magnetization and to the direction of displacement OX.

14. A magnetic position sensor according to claim 1, wherein the fixed and movable parts respectively are partly exchanged for movable and fixed parts respectively.

15. A magnetic position sensor according to claim 1, wherein the stator structure is composed of four parallelepiped ferromagnetic pieces defining two pairs of secondary air gaps which intersect at a center point, each secondary air gap being equipped with magnetosensitive probe.

16. A magnetic position sensor according to claim 1, wherein the movable part can be displaced in two directions OX and OY, and is composed of a ferromagnetic yoke in which there is partly embedded a permanent magnet polarized in a direction of the primary air gap that separates the stator parts from the movable yoke.

17. A magnetic position sensor according to claim 1, wherein the movable part can be displaced in both directions OX and OY, and is composed of a permanent magnet polarized in a direction of the primary air gap that separates the stator parts from the movable yoke, disposed side-by-side with at least one movable ferromagnetic part.

* * * * *

UNITED STATES PATENT AND TRADEMARK OFFICE
CERTIFICATE OF CORRECTION

PATENT NO. : 6,593,734 B1
DATED : July 15, 2003
INVENTOR(S) : Gandel et al.

Page 1 of 1

It is certified that error appears in the above-identified patent and that said Letters Patent is hereby corrected as shown below:

<u>Title page,</u>
Item [86], should read:
-- [86]  PCT No.:     PCT/FR00/00312
        § 371 (c)(1),
        (2), (4) Date:  Sep. 21, 2001 --

Signed and Sealed this

Twenty-first Day of October, 2003

JAMES E. ROGAN
*Director of the United States Patent and Trademark Office*